United States Patent Office 3,405,183
Patented Oct. 8, 1968

3,405,183
ARALKANOLS AND PROCESS FOR THEIR PREPARATION
William J. Farrissey, Jr., Northford, and Adnan A. R. Sayigh, North Haven, Conn., assignors to The Upjohn Company, Kalamazoo, Mich., a corporation of Delaware
No Drawing. Filed May 7, 1964, Ser. No. 365,820
9 Claims. (Cl. 260—613)

ABSTRACT OF THE DISCLOSURE

Novel aralkanols [1 - (2',5'-di-loweralkoxyphenyl)-2-(4''-nitrophenyl)-ethanols are typical] are prepared by condensing the appropriate aldehyde and alkylbenzene substituted by an electron-withdrawing group, in the presence of a strong base catalyst. Hydrogenation of the aralkanols to the corresponding aralkanes and dehydration of the aralkanols to the corresponding stilbenes is also described. The aralkanols, aralkanes and stilbenes are all intermediates e.g. for photographic developers.

---

This invention relates to a novel process for the preparation of organic compounds and is more concerned with the preparation of aralkanols of the formula:

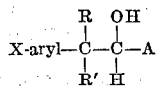

wherein X is an electron withdrawing group selected from the group consisting of nitro, cyano, and arylsulfonyl radicals, wherein R and R' are selected from the group consisting of hydrogen and loweralkyl groups, and wherein A is an organic radical, which when bound to the group

forms an aldehyde of the formula

which is not capable of undergoing the aldol condensation.

Most particularly, the invention is concerned with novel 1-(2',5'di-loweralkoxyphenyl)-2-(4''-nitrophenyl)-ethanols of the formula:

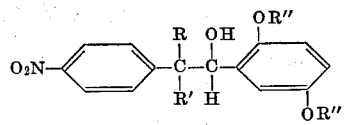

wherein R and R' are defined as above, and R'' is a loweralkyl, and the method of its preparation.

Moreover, this invention is concerned with the hydrogenation of the thus-produced secondary alcohols to substituted ethanes; for example the hydrogenation of a 1-(2',5' - diloweralkoxyphenyl)-2-(4''-nitrophenyl)ethanol to the corresponding 4'[2' - (2'',5'' - diloweralkoxyphenyl)]ethylaniline.

The process and resulting products of this novel invention can be illustratively represented as follows:

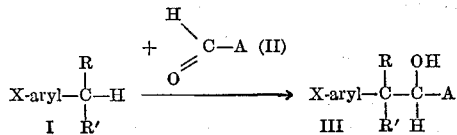

wherein X, R, R' and A are defined as hereinabove.

The term "loweralkyl group" as herein used refers to methyl, ethyl, propyl, butyl, isobutyl, and the like, and similarly the term "loweralkoxy" as herein used refers to methoxy, ethoxy, propoxy, butoxy, and the isomeric branched chain equivalents thereof.

Representative compounds having the structural Formula I include: alkylbenzenes with an electron-withdrawing group X, as defined above, in position 2 or 4, e.g., 4-nitrotoluene, 2-nitrotoluene, 4-nitroethylbenzene, 4-nitroisopropylbenzene, 2 - nitroethylbenzene, 2-chloro-4-nitrotoluene, 4 - methylbenzonitrile, 2-methylbenzonitrile, 4-nitro - 1 - methylnaphthalene, 2-chloro-4-nitrotoluene, phenyl p-tolyl sulfone, o-tolyl p-tolyl sulfone, and the like.

Representative aldehydes of the type

include: benzaldehyde and substituted benzaldehydes, e.g. 4 - methylbenzaldehyde, tolualdehydes, monochlorobenzaldehydes, polychlorobenzaldehydes; particularly 2,5-dialkoxybenzaldehydes, e.g. 2,5 - dimethoxybenzaldehyde, 2,5 - diethoxybenzaldehyde, 2,5-dipropoxybenzaldehyde, 2,5-dibutoxybenzaldehyde, 2,5-di-isobutoxybenzaldehyde; naphthaldehydes, e.g. alpha-naphthaldehyde, beta-naphthaldehyde; acrolein, glyoxal, formaldehyde, terephthaldehyde, furfural, 2-thiophenecarboxaldehyde, and the like.

In the preferred embodiment of the invention, in which a p-nitrotoluene is condensed with a 2,5-di-loweralkoxybenzaldehyde in the presence of a strongly basic catalyst, the resulting product, 1 - (2',5'-di-loweralkoxyphenyl)-2-(4''-nitrophenyl)-ethanol, can be converted by hydrogenation to the corresponding di-loweralkoxyphenyl ethyl aniline, which are compounds useful as developers in color photography (British patent specification No. 853,482). The conversion of the substances of Formula III to active photographic developers is shown in the examples. The compounds of Formula III, in which at least one of the R— parameters is hydrogen, can be dehydrated to give useful stilbene compounds [Kaufmann, Ber., 54, 795 (1921), 2,5-dimethoxy-4'-nitrostilbene]. The present synthesis for this type of stilbene is by far easier to carry out than the methods of Kaufmann.

In carrying out the process of the present invention, the selected aldehyde of the formula

defined as before, and the aromatic compound of the formula

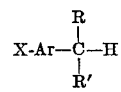

defined as before, are dissolved in an organic solvent, preferably in an aprotic, highly polar solvent, having maximum ion solvating ability and lacking active hydrogen atoms. Useful solvents of this type are the dialkyl amides of hydrocarbon carboxylic acids, wherein the alkyl group has from 1 to 6 carbon atoms, inclusive, and the acid has from 1 to 20 carbon atoms, inclusive. Examples of such dialkyl amides of hydrocarbon carboxylic acids include: dimethylformamide, diethylformamide, dimethylacetamide, diethylacetamide, dimethylpropionamide, diethylbutyramide, dipropyllauramide, dibutyldecanamide, diethyleicosanamide, and the like. Other useful solvents include N,N,N'N'-tetramethylurea, hexamethylphosphoramide, N-acetylpiperidine, N-acetylmorpholine, and the like. Additionally, the aprotic polar solvent may be diluted, if desired, with as much as up to 50% by volume of a non-polar aprotic solvent, such as benzene, cyclohexane, Skellysolve B hexanes, and the like.

The ratio of the aldehyde to the aralkyl compound containing the electron-withdrawing group influences to some extent the yield of the final product. In many cases an equilibrium exists as follows:

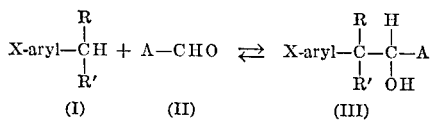

Yields can be improved by using either of the two reagents, aralkyl compounds (I) or aldehyde (II) in excess. Thus, a molar ratio of 1 to 5 moles of one component or even more to one mole of the other reagent is preferred.

In the preferred embodiment of this reaction the air is removed from the reaction vessel by expelling it with a stream of nitrogen. After the air is removed, a strongly basic catalyst is added, such as alkali metal hydroxides, for example lithium hydroxide, sodium hydroxide, potassium hydroxide; metal alkoxides, such as sodium methoxide, potassium ethoxide; quaternary alkyl ammonium hydroxide, for example tetrabutyl ammonium hydroxide, tetraethyl ammonium hydroxide, and the like. The reaction is usually carried out at temperatures between 0 and 150° C., with a temperature between 0 and 50° C. preferred. The reaction time varies between one-half hour and 48 hours. After the reaction is completed, the basic reaction mixture is neutralized or acidified and the desired product recovered by conventional procedures, e.g., by extraction, with water-insoluble solvents, such as Skellysolve B hexanes, cyclohexane, benzene, toluene, chloroform, carbon tetrachloride and the like. Evaporation of the solvent gives the desired product. The product may further be purified in conventional manner by solvent partition, additional extractions, and recrystallization.

If desired, the compounds of Formula III can be hydrogenated in the presence of commonly used hydrogenation catalysts, e.g., Raney nickel, platinum, palladium, or ruthenium catalysts. A 5% palladium-on-charcoal catalyst, 25–200 pounds of hydrogen pressure, and a temperature between 10 and 100° C. are the preferred conditions. When nitro groups are present, these will be reduced to amino groups.

Those compounds of Formula III, wherein one of the R— or R'— parameters is hydrogen, can be dehydrated by mild dehydrating methods to the corresponding olefins of formula

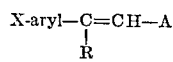

wherein R, X, and A have the same significance as in Formula III. Of particular interest is the dehydration when the group A is phenyl or substituted phenyl, as in this event useful stilbenes are produced, e.g., a stilbene of the formula:

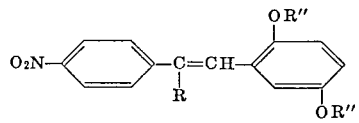

wherein R'' is a loweralkyl group, and R is selected from the group consisting of hydrogen and loweralkyl.

The following examples illustrate the method and products of the present invention but are not to be construed as limiting.

Example 1.—1-(2',5'-dimethoxyphenyl)-2-(4''-nitrophenyl)ethanol

A solution was prepared containing in 200 ml. of dimethylformamide 16.6 g. (0.1 mole) of 2,5-dimethoxybenzaldehyde and 13.7 g. (0.1 mole) of p-nitrotoluene. This solution was flushed with a stream of nitrogen and while in a nitrogen atmosphere 2.4 g. (0.1 mole) of lithium hydroxide was added. The mixture was then heated with stirring to a temperature between 50 and 57° C. for a period of 17 hours. Thereafter, the reaction mixture was cooled, acidified with 5% hydrochloric acid and diluted with 400 ml. of water. The aqueous mixture was then extracted with three 200-ml. portions of benzene, the benzene extracts were combined, dried over anhydrous sodium sulfate, and evaporated to give 29.4 g. of a red oil. This oil was extracted with 50 ml. of a 70:30 by volume mixture of cyclohexane:benzene. The insoluble remaining oil was cooled to give 15.2 g. of an orange solid, which consisted of 1 - (2',5' - dimethoxyphenyl)-2-(4''-nitrophenyl)ethanol.

Concentration of the filtrate and cooling gave an additional 1 g. of the desired material, 1-(2',5'-dimethoxyphenyl) - 2-(4''-nitrophenyl)ethanol. Evaporation of the remaining solvent gave 14.1 g. of a red oil, which consisted essentially of a mixture of p-nitrotoluene, 2,5-dimethoxybenzaldehyde and a small amount of 1-(2,5'-dimethoxyphenyl) - 2-(4''-nitrophenyl)ethanol. This material was dissolved in 50 ml. of dimethylformamide and treated under nitrogen with 1.2 g. (0.05 mole) of lithium hydroxide, as described above. Following the same workup procedure, there was obtained an additional amount of 7.1 g. of 1 - (2',5' - dimethoxyphenyl)-2-(4''-nitrophenyl)ethanol and 4.7 g. of p-nitrotoluene and dimethoxybenzaldehyde. The total yield of 1-(2',5'-dimethoxyphenyl)-2-(4''-nitrophenyl)ethanol was 23.3 g. or 78% of theory.

Example 2.—1-(2',5'-dimethoxyphenyl)-2-(4''-nitrophenyl)ethanol

A solution of 8.3 g. (0.05 mole) of dimethoxybenzaldehyde and 6.85 g. (0.05 mole) of p-nitrotoluene in 100 ml. of dimethylformamide were heated with 0.2 g. (0.005 mole) of powdered sodium hydroxide at room temperature (22–29° C.) for a period of 2.5 hours. The reaction mixture was thereupon worked up as in Example 1 to give in two yields, 8.36 g. (55%) of 1-(2',5'-dimethoxyphenyl)-2-(4''-nitrophenyl)ethanol as yellow solid having a melting point of 100–102° C.

Example 3.—1-(2',5'-dimethoxyphenyl)-2-(4''-nitrophenyl)ethanol

Likewise as in Example 2, 25.5 g. [0.15 mole (3 mole equivalent excess)] of p-nitrotoluene was reacted with 8.3 g. (0.05 mole) of dimethoxybenzaldehyde in the presence of powdered sodium. A yield of 14.4 g., equal to 95%, of 1 - (2',5' - dimethoxyphenyl)-2-(4''-nitrophenyl)ethanol was obtained.

Example 4.—1-(2',5'-diethoxyphenyl)-2-(4''-nitrophenyl)ethanol

In the manner given in Example 2, 2,5-diethoxybenzaldehyde, p-nitrotoluene and sodium hydroxide were reacted at room temperature to give 1-(2',5'-diethoxyphenyl)-2-(4''-nitrophenyl)ethanol.

Example 5.—1-(2',5'-dipropoxyphenyl)-2-(4''-nitrophenyl)ethanol

In the manner given in Example 2, 2,5-dipropoxybenzaldehyde, p-nitrotoluene and sodium hydroxide were reacted at room temperature to give 1-(2',5'-dipropoxyphenyl)-2-(4''-nitrophenyl)ethanol.

Example 6.—1-(2',5'-di-isopropoxy)-2-(4''-nitrophenyl)ethanol

In the manner given in Example 2, 2,5-di-isopropoxybenzaldehyde, p-nitrotoluene and sodium hydroxide were reacted at room temperature to give 1-(2',5'-di-isopropoxy)-2-(4''-nitrophenyl)ethanol.

Example 7.—1-(2',5'-dibutoxyphenyl)-2-(4''-nitrophenyl)ethanol

In the manner given in Example 2, 2,5-dibutoxybenzaldehyde, p-nitrotoluene and sodium hydroxide were reacted at room temperature to give 1 - (2',5'-dibutoxyphenyl)-2-(4''-nitrophenyl)ethanol.

Example 8.—1-(2',5'-di-isobutoxy)-2-(4''-nitrophenyl)ethanol

In the manner given in Example 2, 2,5-diisobutoxybenzaldehyde, p-nitrotoluene and sodium hydroxide were reacted at room temperature to give 1-(2',5'-diisobutoxyphenyl)-2-(4''-nitrophenyl)ethanol.

Example 9.—1(2',5'-dimethoxyphenyl)-2-(2''-nitrophenyl)ethanol

In the manner given in Example 2, 2,5-dimethoxybenzaldehyde, o-nitrotoluene and sodium hydroxide were reacted at room temperature to give 1-(2',5'-dimethoxyphenyl)-2-(2''-nitrophenyl)ethanol.

Example 10.—1-(2',5'-diethoxyphenyl)-2-(2''-nitrophenyl)ethanol

In the manner given in Example 2, 2,5-diethoxybenzaldehyde, o-nitrotoluene and sodium hydroxide were reacted at room temperature to give 1-(2',5'-diethoxyphenyl)-2-(2''-nitrophenyl)ethanol.

Example 11.—1-(2',5'-dimethoxyphenyl)-2-methyl-2-(4''-nitrophenyl)ethanol

In the manner given in Example 2, 4-nitroethylbenzene, 2,5-dimethoxybenzaldehyde and powdered potassium hydroxide were reacted to give 1-(2',5'-dimethoxyphenyl)-2-methyl-2-(4-nitrophenyl)ethanol.

Example 12.—1(2',5'-dimethoxyphenyl)-2,2-dimethyl-2-(4''-nitrophenyl)ethanol

In the manner given in Example 2, 4-nitro-isopropylbenzene, 2,5-dimethoxybenzaldehyde and powdered sodium hydroxide were reacted to give 1-(2',5'-dimethoxyphenyl)-2,2-dimethyl-2-(4''-nitrophenyl)ethanol.

Example 13.—1-(2',5'-dimethoxyphenyl)-2,2-diethyl-2-(4''-nitrophenyl)ethanol

In the manner given in Example 2, 4-nitro-(3-pentyl)-benzene, 2,5-dimethoxybenzaldehyde and powdered sodium hydroxide were reacted to give 1-(2',5'-dimethoxyphenyl)-2,2-diethyl-2-(4''-nitrophenyl)ethanol.

Example 14.—1-(2',5'-dimethoxyphenyl)-2-(4''-cyanophenyl)ethanol

In the manner given in Example 2, 2,5-dimethoxybenzaldehyde, 4-methylbenzonitrile and powdered sodium hydroxide were reacted together to give 1-(2',5'-dimethoxyphenyl)-2-(4''-cyanophenyl)ethanol.

Example 15.—1(2',5'-dimethoxyphenyl)-2-(2''-cyanophenyl)ethanol

In the manner given in Example 2, 2,5-dimethoxybenzaldehyde, 2-methylbenzonitrile and powdered sodium hydroxide were reacted together to give 1-(2',5'-dimethoxyphenyl)-2-(2''-cyanophenyl)ethanol.

Example 16.—1(2',5'-diethoxyphenyl)-2-(2''-chloro-4''-nitrophenyl)ethanol

In the manner given in Example 1, 2,5-diethoxybenzaldehyde, -2-chloro-4-nitrotoluene and lithium hydroxide were reacted together to yield 1-(2',5'-diethoxyphenyl)-2-(2''-chloro-4''-nitrophenyl)ethanol.

Example 17.—1-(2',5'-diethoxytolyl)-2-(4''-nitrophenyl)ethanol

In the manner given in Example 2, 2,5-diethoxytolualdehyde, p-nitrotoluene and sodium hydroxide were reacted at room temperature to give 1-(2',5'-diethoxytolyl)-2-(4''-nitrophenyl)ethanol.

Example 18.—1-tolyl-2-(4''-nitrophenyl)ethanol

In the manner given in Example 2, tolualdehyde, p-nitrotoluene and sodium hydroxide were reacted at room temperature to give 1-tolyl-2-(4''-nitrophenyl)ethanol.

Example 19.—1-(α-naphthyl)-2-(4''-nitrophenyl)ethanol

In the manner given in Example 2, α-naphthaldehyde, p-nitrotoluene and sodium hydroxide were reacted at room temperature to give 1-(α-naphthyl)-2-(4''-nitrophenyl)ethanol.

Example 20.—1-(3',4'-dichlorophenyl)-2-(4''-nitrophenyl)ethanol

In the manner given in Example 2, 3,4-dichlorobenzaldehyde, p-nitrotoluene and sodium hydroxide were reacted at room temperature to give 1-(3',4'-dichlorophenyl)-2-(4''-nitrophenyl)ethanol.

Example 21.—1-vinyl-2-(p-nitrophenyl)ethanol

In the manner given in Example 2, acrolein, p-nitrotoluene and sodium hydroxide were reacted at room temperature to give 1-vinyl-2-(p-nitrophenyl)ethanol.

Example 22.—1-aldehydo-2-(p-nitrophenyl)ethanol

In the manner given in Example 2, glyoxal, p-nitrotoluene and sodium hydroxide were reacted at room temperature to give 1-aldehydo-2-(p-nitrophenyl)ethanol.

Example 23.—1-(2',5'-diethoxyphenyl)-2-[4''-(phenylsulfonyl)phenyl]ethanol

In the manner given in Example 1, 2,5-diethoxybenzaldehyde, phenyl p-tolyl sulfone and lithium hydroxide were reacted together to yield 1-(2',5'-diethoxyphenyl)-2-[4''-(phenylsulfonyl)phenyl]ethanol.

Example 24.—1-(2',5'-dimethoxytolyl)-2-[2''-(phenylsulfonyl)-phenyl]ethanol

In the manner given in Example 2, 2,5-dimethoxytolualdehyde, phenyl o-tolyl sulfone and sodium hydroxide were reacted at room temperature to give 1-(2',5'-dimethoxytolyl)-2-[2''-(phenylsulfonyl)phenyl]ethanol.

Example 25.—2,5-dimethoxy-4'-nitrostilbene

Two grams of 1-(4'-nitrophenyl)-2-(2'',5''-dimethoxyphenyl)ethanol were dissolved in 25 ml. of benzene and to this was added 2 ml. of 85% phosphoric acid. The solution was heated at reflux for about 3 to 4 hours. Thereafter the organic layer was separated and the solution was concentrated by distilling off a portion of the benzene. The solution was then cooled, yielding 1.4 g. (75%) of yellow crystals of 2,5-dimethoxy-4'-nitrostilbene of melting point 112–114° C.

Instead of phosphoric acid other acid dehydration agents can be used, particularly hydrochloric, hydrobromic, sulfuric acid and the like.

Example 26.—2,5-diethoxy-4'-nitrostilbene

Two grams of 1-(4'-nitrophenyl)-2-(2",5"-diethoxyphenyl)ethanol were dissolved in 25 ml. of benzene and to this was added 2 ml. of 85% phosphoric acid. The solution was heated at reflux for about 3 to 4 hours. Thereafter the organic layer was separated, and the solution was concentrated by distilling off a portion of the benzene. Upon cooling, crystals of 2,5-diethoxy-4'-nitrostilbene formed, which were recovered by filtration.

Example 27.—4-[2'-(2",5"-dimethoxyphenyl)] ethylaniline hydrochloride

A solution was prepared containing in 100 ml. of ethyl acetate 5 g. of 1-(2',5'-dimethoxyphenyl)-2-(4"-nitrophenyl)ethanol and 25 g. of 5% palladium-on-charcoal catalyst. After flushing the vessel containing the solution with hydrogen to expel the air, the container was charged with hydrogen at room temperature to a pressure of about 100 pounds per square inch, and this pressure was maintained by admitting hydrogen as needed. The reaction mixture was agitated efficiently until about the theoretical amount of hydrogen had reacted. Thereafter, the mixture was filtered to remove the catalyst and the product precipitated by passing hydrogen chloride through the solution. The precipitate was collected on filter, the dried material weighed 4.1 g. and consisted of the hydrochloride of 4'[2'-(2",5"-dimethoxyphenyl)]ethylaniline, a white solid, melting at 155–158° C.

Example 28.—4-[2'-(2",5"-dimethoxyphenyl)] ethylaniline hydrochloride

In the manner given in Example 27, 2,5-dimethoxy-4'-nitrostilbene was reacted with hydrogen in the presence of a hydrogenation catalyst, 5% palladium-on-charcoal, to give 4-[2'-(2",5"-dimethoxyphenyl)] ethylaniline hydrochloride.

Example 29.—4-[2'-(2",5"-diethoxyphenyl)] ethylaniline hydrochloride

In the manner given in Example 27, 1-(2',5'-diethoxyphenyl)-2-(4"-nitrophenyl)ethanol was hydrogenated in the presence of a palladium-on-charcoal catalyst to give 4-[2'-(2",5"-diethoxy - phenyl)]ethylaniline, which was recovered as the hydrochloride.

Example 30.—4-[2'-(2",5"-dipropoxyphenyl)] ethylaniline hydrochloride

In the manner given in Example 27, 1-(2',5'-dipropoxyphenyl) - 2 - (4"-nitrophenyl)ethanol was hydrogenated in the presence of a palladium-on-charcoal catalyst to give 4 - [2' - (2",5" - dipropoxyphenyl)] ethylaniline, which was recovered as the hydrochloride.

Example 31.—4-[2'-(2",5"-dibutoxyphenyl)] ethylaniline hydrochloride

In the manner given in Example 27, 1-(2',5'-dibutoxyphenyl)-2-(4"-nitrophenyl)ethanol was hydrogenated in the presence of a palladium-on-charcoal catalyst to give 4-[2'-(2",5" - dibutoxyphenyl)]ethylaniline, which was recovered as the hydrochloride.

Example 32.—4-[2'-(2",5"-diethoxytolyl)] ethylaniline hydrochloride

In the manner given in Example 27, 1-(2',5'-diethoxytolyl)-2-(4"-nitrophenyl)ethanol was hydrogenated in the presence of a palladium-on-charcoal catalyst to give 4-[2'-(2",5"-diethoxytolyl)]ethylaniline, which was recovered as the hydrochloride.

Example 33.—2-[2'-(2",5"-dimethoxyphenyl)] ethylaniline hydrochloride

In the manner given in Example 27, 1-(2',5'-dimethoxyphenyl)-2-(2" - nitrophenyl)ethanol was hydrogenated in the presence of a palladium-on-charcoal catalyst to give 2-[2'-(2",5"-dimethoxyphenyl)]ethylaniline, which was recovered as the hydrochloride.

Example 34.—2,4-diamino-[2'-(2",5"-dimethoxyphenyl)]ethylbenzene hydrochloride In the manner given in Example 27, 1-(2',5'-dimethoxyphenyl)-2-(2",4"-dinitrophenyl)ethanol was hydrogenated in the presence of a palladium-on-charcoal catalyst to give 2,4 - diamino - [2'-(2",5"-dimethoxyphenyl)]ethylbenzene, which was recovered as the hydrochloride.

In the manner given in Example 27, other 1-(2',5'-diloweralkoxyphenyl)-2-(2"- or 4"-dinitorphenyl)ethanols can be hydrogenated to give the corresponding 2- or 4-amino or 2,4-diamino[2'-(2",5"-di-loweralkoxyphenyl)] ethylbenzenes, which are recovered as hydrochlorides. Representative 2- or 4-amino or 2,4-diamino[2'-(2",5"-di-loweralkoxyphenyl)]ethylbenzene hydrochlorides thus obtained include:

4-[2'-(2",5"-dimethoxyphenyl)]ethylaniline hydrochloride,
4-[2'-(2",5"-dibutoxyphenyl)]ethylaniline hydrochloride,
4-[2'-(2",5"-dipropoxyphenyl)]ethylaniline hydrochloride,
4-[2'-(2",5"-dimethoxytolyl)ethylaniline hydrochloride,
2-[2'-(2",5"-dimethoxyphenyl)]ethylaniline hydrochloride,
2,4-diamino-[2'-(2",5"-dipropoxyphenyl)]ethylaniline hydrochloride,
4-[2'-(2",5"-dimethoxyphenyl)]ethyl-(2-chlorobenzene) hydrochloride, and the like.

In order to obtain a free aniline of this type compound instead of the hydrochloride, the aniline chloride in aqueous solution is treated with a calculated amount of triethylamine and free aniline is extracted with a water-insoluble solvent, e.g., methylene chloride, chloroform, or the like. The extracts are evaporated to leave the free aniline.

The free aniline can be redissolved in an acid to give other aniline salts, such as the hydrobromide, hydroiodides, hydrogensulfate, chlorate, perchlorate, nitrate, and the like.

We claim:
1. A process for the production of an aralkanol of the formula:

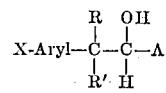

wherein X is an electron withdrawing radical selected from the group consisting of nitro, cyano and arylsulfonyl; wherein R and R' are moieties selected from the group consisting of hydrogen and loweralkyl and wherein A is an organic radical which when bound to the group

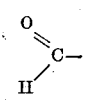

forms an aldehyde of the formula:

said aldehyde being selected from the group consisting of benzaldehyde, tolualdehyde, 2,5-dimethoxy-tolualdehyde, chlorobenzaldehyde, 3,4-dichlorobenzaldehyde, 2,5 - di (loweralkoxy) benzaldehyde, α-naphthaldehyde, acrolein, glyoxyal, formaldehyde, terephthaldehyde, furfural and 2-thiophenecarboxaldehyde, which process comprises: condensing an alkylbenzene of the formula:

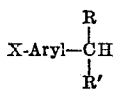

wherein X, R and R' are defined above, said alkylbenzene being selected from the group consisting of 4-nitrotoluene, 2-nitrotoluene, 4-nitroethylbenzene, 4-nitroisopropyl-benzene, 2-nitroethylbenzene, 2-chloro-4-nitrotoluene, 4-nitro-(3-pentyl-) -benzene, 4-methylbenzonitrile, 2-methylbenzonitrile, 4-nitro-1-methylnaphthalene, 2-chloro-4-nitrotoluene, phenyl p-tolyl sulfone and o-tolyl p-tolyl sulfone, in an aprotic polar solvent, which lacks reactive hydrogen atoms, with an aldehyde of the formula:

defined above, at a temperature within the range of 0° C. to 150° C. in the presence of a strongly basic catalyst.

2. The process of claim 1, wherein

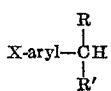

is p-nitrotoluene.

3. The process of claim 1, wherein

is 2,5-di-loweralkoxybenzaldehyde.

4. The process of claim 1, wherein

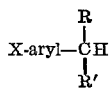

is p-nitrotoluene and

is a 2,5-di-loweralkoxybenzaldehyde.

5. The process of claim 1, wherein the solvent is a dialkylacylamide wherein the alkyl group has between one and six carbon atoms, inclusive, and the acyl group is of a aliphatic hydrocarbon monocarboxylic acid having from 1 to 20 carbon atoms, inclusive.

6. The process of claim 4, wherein the solvent is dimethylformamide.

7. A process for the production of 1-(2',5'-dimethoxyphenyl) - 2 - (4"-nitrophenyl)ethanol, which comprises: reacting together 2,5 - dimethoxybenzaldehyde and p-nitrotoluene in a dialkylacylamide, wherein the alkyl group has between 1 and 6 carbon atoms, inclusive, and the acyl group is of an aliphatic hydrocarbon monocarboxylic acid having from 1 to 20 carbon atoms, inclusive, in the presence of an alkali metal hydroxide at temperature within the range of 0° C. to 150° C.

8. A 1-(2',5' - di - loweralkoxyphenyl)-2-(4"-nitrophenyl)ethanol of the formula

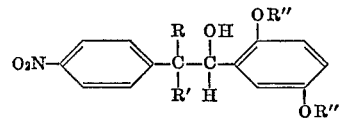

wherein R and R' are selected from the group consisting of hydrogen and loweralkyl and R" is loweralkyl.

9. 1-(2',5'-dimethoxyphenyl) - 2 - (4" - nitrophenyl) ethanol.

References Cited

Dale et al.: Journal American Chem. Soc., vol. 81 (1959), pp. 2143–2146.

BERNARD HELFIN, *Primary Examiner.*